A. WHITE AND M. GRANUM.
GREASE GUN.
APPLICATION FILED JAN. 19, 1920.

1,388,625.

Patented Aug. 23, 1921.
2 SHEETS—SHEET 2.

WITNESSES

INVENTOR
A. WHITE,
M. GRANUM,
BY
ATTORNEYS

UNITED STATES PATENT OFFICE.

ANDREW WHITE AND MARTIN GRANUM, OF MONTEVIDEO, MINNESOTA.

GREASE-GUN.

1,388,625.  Specification of Letters Patent.  Patented Aug. 23, 1921.

Application filed January 19, 1920. Serial No. 352,353.

*To all whom it may concern:*

Be it known that we, ANDREW WHITE and MARTIN GRANUM, citizens of the United States, and residents of Montevideo, in the county of Chippewa and State of Minnesota, have invented certain new and useful Improvements in Grease-Guns, of which the following is a specification.

Our invention relates to grease guns, and a purpose of our invention is the provision of a grease gun which is adapted to lubricate vehicle axles without the necessity of removing the wheels from the axles.

We will describe one form of grease gun embodying our invention and will then point out the novel features thereof in claims.

In the accompanying drawings:—

Similar reference characters refer to similar parts in each of the several views.

Figure 1:
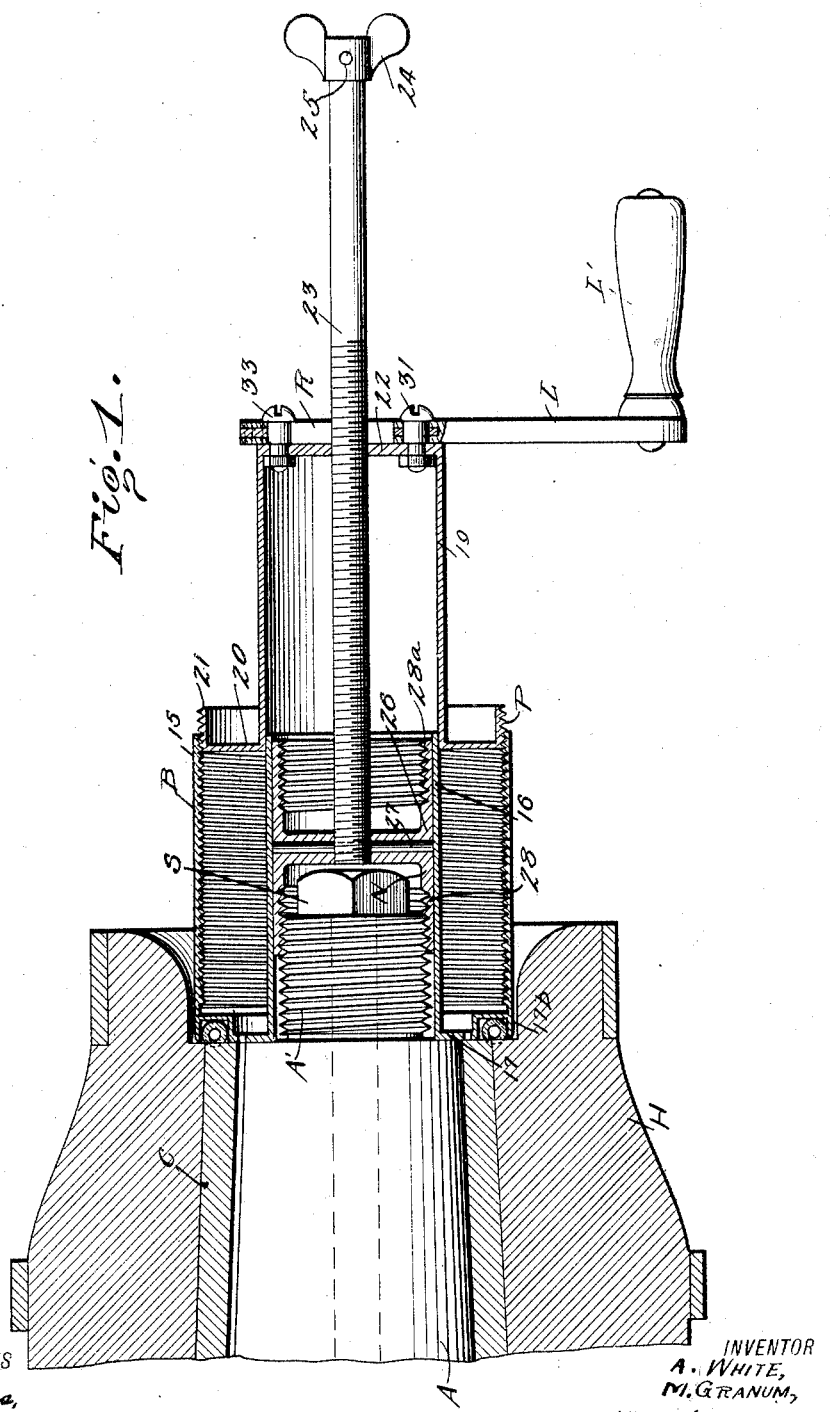
Figure 1 is a view, showing in section a vehicle axle and wheel hub having applied thereto one form of grease gun embodying our invention.

Referring specifically to the drawings, and particularly to Fig. 1, H designates the hub of a conventional form of vehicle wheel in which works an axle skein A provided at its outer end with a screw-threaded head A', and extending through the skein and head is a conventional form of lag screw S. Interposed between the hub and the skein A is a sleeve bearing C. In all forms of vehicle axles and wheels with which we are familiar, there is a limited amount of play between the bearing C and the axle skein. This play provides a gap between the sleeve and axle at the upper side thereof, as clearly shown in the drawings. It is by means of this gap that we effect a lubrication of the wheel and axle through the medium of the grease gun which we will now describe.

Figure 3:
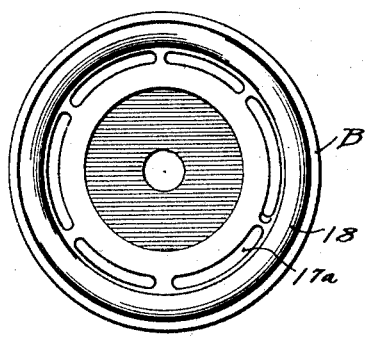
Fig. 3 is a view similar to Fig. 2, showing the opposite end of the grease gun.
Figure 4:
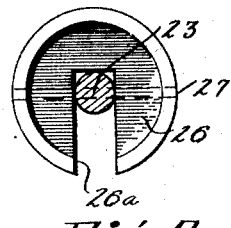
Fig. 4 is a detail view, showing the manner in which the spindle is connected to the attaching nut.

The grease gun embodying the subject-matter of our invention comprises a grease barrel B consisting of an outer cylindrical member 15 and an inner cylindrical body 16 disposed concentrically of the outer member and spaced therefrom to provide a grease receiving compartment. The inner end of the barrel B is closed by an annular wall 17, such wall being formed with a circular series of slots 17ª, and an annular groove 17ᵇ in which is mounted a tubular rubber gasket 18, as clearly shown in Figs. 1 and 3. This wall 17 forms an integral connection between the outer cylinder 15 and the inner cylinder 16. As shown in Fig. 1, the inner wall of the outer cylinder 15 is screw threaded to receive a plunger designated generally at P and comprising a cylinder 19 having its forward end provided with an annular flange 20 which carries a collar 21 threaded exteriorly to coact with the threads of the outer cylinder 15. The outer end of the cylinder 19 is closed by a wall 22 which is formed axially thereof with an opening through which extends a spindle 23. As shown in Fig. 1, the spindle 23 is screw threaded for a major portion of its length and is adapted to be slid forwardly or rearwardly within such cylinder 19 through the opening in the member 22. The outer end of the spindle 23 carries a winged nut 24 which is secured thereto by means of a pin 25, while the inner end is detachably associated with a sleeve nut designated generally at N. As shown in Figs. 1 and 4, the sleeve nut N comprises a cylindrical body divided into two compartments by a partition 26 which is slotted, as at 26ª to permit the application of the inner end of the spindle 23 thereto. The spindle 23 is locked within the partition 26 by a pin 27 which extends through suitable openings formed in the partition and spindle in the manner indicated in dash lines in Fig. 4. As shown in Fig. 1, the inner wall of one compartment of the nut is threaded with right-hand screw threads 28 while the inner wall of the other compartment is provided with left hand screw threads 28ª, the purpose of this threading being to allow of the application of the nut to either head A' of the axle A.

As shown in Fig. 1, the nut N is slidably fitted within the inner cylinder 16 of the barrel B and is of a diameter to embrace and threadedly engage the head A' of the axle A. This nut N forms the securing means for the entire grease gun and is adapted to securely hold the gun as a unit against the axle for the application of the grease thereto. This is effected by rotation of the spindle 23 in such direction as to cause the nut to feed inwardly upon the head A'. The nut may be readily removed from the head by reversing the rotation of the spindle 23, as will be understood.

Figure 2:
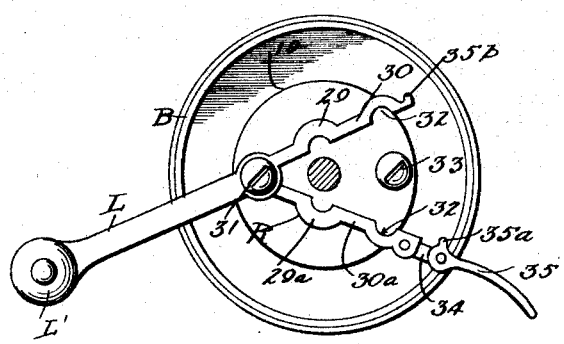
Fig. 2 is a view, showing in end elevation the grease gun shown in Fig. 1, with the attaching spindle shown in section and the crank nut in inactive position.
Figure 5:
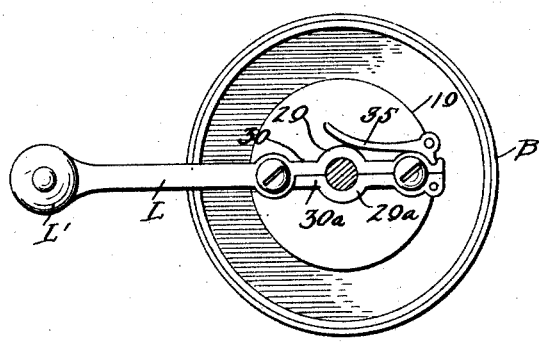
Fig. 5 is a view similar to Fig. 2, showing the crank nut in the active position.

The spindle 23 is adapted to be engaged by a split nut designated generally at R, such nut comprising a pair of semicircular sections 29 and 29ª formed integral with arms 30 and 30ª, respectively. As shown in Figs. 1, 2 and 5, the arm 30 constitutes an extension of an operating lever L, and such lever and arm are pivoted on the wall 22 of the plunger by a bolt 31. The arm 30ª is also pivotally connected to the bolt 31 but is movable independently of the lever L. As shown in Fig. 2, the levers 30 and 30ª are formed adjacent their outer ends with arcuate recesses 32 which coact to provide an opening for the reception of a bolt 33. The arm 30ª carries a link 34, to which is pivotally connected a locking lever 35. This locking lever 35 is formed with a lug 35ª which is adapted to engage the lug 35ᵇ formed on the free end of the arm 30. As shown in Fig. 5 the two lugs are engaging each other with the arms 30 or 30ª in the active or contracted position. It will be understood that the lever 35 is adapted to be swung about its pivot so as to cause the lug 35ª to engage the lug 35ᵇ and to thereby prevent the separation of the two arms. In the active position of the arms, they embrace the bolt 33 with the sections 29 and 29ª of the nut R threadedly embracing the spindle 23.

The operating lever L carries a handle L' for the manual rotation of the plunger P to effect a feeding thereof inwardly or outwardly within the barrel B.

In the operation of the grease gun, the plunger P is removed from the barrel B by first moving the arms 30 and 30ª to the active position through the manipulation of the locking lever 35, whereupon the plunger P may be rotated by the handle L' to effect an outward feeding thereof with respect to the barrel. With the plunger P removed from the barrel B, the latter is now filled with grease and the plunger replaced to the position shown in Fig. 1. The gun is now ready for its application to the axle skein A. In applying the gun to the axle, the barrel B is placed over the head A' in the manner shown in Fig. 1, so that the head threadedly engages the nut N. Should the head A' be provided with left-hand threads or the reverse to that shown in the drawing, the securing nut N can be easily reversed so as to present the left-hand threads to the head by removing the nut from the barrel and reversing its position upon the spindle 23 by swinging the same on the pin 27.

With the nut N screwed home upon the head A', the grease gun as a unit is held securely on the axle skein. By now rotating the plunger P, it is fed inwardly thus ejecting the grease from the barrel through the slots 17ª and between the sleeve bearings C and the axle skein A, it being understood that the gasket 18 prevents the grease from squeezing out from between the gun and sleeve. In this manner a thorough lubrication of the axle will be readily effected without removing the wheel therefrom.

Although we have herein shown and described only one form of grease gun embodying our invention, it is to be understood that various changes and modifications may be resorted to without departing from the spirit of the invention and the spirit and scope of the appended claims.

Having thus described our invention, we claim:

1. In combination, an axle skein, including a threaded head, and a grease gun comprising, a barrel, a plunger movable within the barrel, means for actuating said plunger, and means for attaching said barrel to said skein comprising, a sleeve nut having right and left hand screw threads, and a threaded spindle for actuating the nut.

2. A grease gun comprising a barrel including concentric cylinders, a plunger movable between said cylinders, a reversible nut adapted to different screw threads slidable within the inner cylinder of said barrel, means for actuating said plunger, and means for actuating said nut.

3. A grease gun comprising a barrel including concentric cylinders, a plunger threadedly mounted between the cylinders, an attaching nut slidable within the inner cylinder of said barrel, means for actuating said plunger, and means for actuating said nut.

4. A grease gun comprising a barrel, a plunger within the barrel, an attaching nut having right and left hand screw threads slidable through the barrel, means for actuating said plunger, and means for actuating said nut.

5. A grease gun comprising a barrel, a plunger movable within the barrel, an attaching nut adapted to engage the head of an axle skein, means for actuating said plunger, and means for actuating said nut, the last means being supported by the first means and threadedly engaging the same.

6. A grease gun comprising a barrel including concentric cylinders connected at one of their ends by a perforated wall, a gasket seated within said wall, a reversible nut slidable within the inner cylinder, a screw threaded spindle detachably associated with said nut, a plunger working within said barrel and including a cylinder, arms pivotally carried by the last mentioned cylinder and embracing said spindle, and a handle carried by one of the arms.

7. A grease gun comprising, a barrel including concentric cylinders connected at one of their ends by a perforated wall, a reversible nut adapted to different screw threads slidable within the inner cylinder, a screw threaded spindle connected to the nut, a plunger working within said barrel and disposed concentrically of said spindle, means carried by the plunger engageable with the spindle for maintaining the barrel in fixed relation to the spindle and a feeding of the spindle through the plunger when the plunger is rotated, and a handle for actuating the plunger.

8. A grease gun comprising, a barrel, a reversible nut adapted to different screw threads slidably fitted within the barrel, a screw threaded spindle for actuating the nut, a plunger threadedly engaging the barrel and the spindle, and means for actuating the plunger.

9. A grease gun comprising, a barrel, a plunger threadedly engaging the barrel, a nut slidable through the barrel, a spindle connected to the nut and disposed axially of the plunger, a split nut carried by the plunger and threadedly engaging the spindle, and a handle for actuating the plunger.

ANDREW WHITE.
MARTIN GRANUM.